(12) United States Patent
Johnson et al.

(10) Patent No.: US 9,811,535 B1
(45) Date of Patent: Nov. 7, 2017

(54) CREATING SOCIAL NETWORK GROUPS

(71) Applicant: Google Inc., Mountain View, CA (US)

(72) Inventors: Michael Patrick Johnson, Sunnyvale, CA (US); Thad Eugene Starner, Atlanta, GA (US); Christopher Richard Wren, Arlington, MA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 14/066,651

(22) Filed: Oct. 29, 2013

(51) Int. Cl.
*G06F 17/30* (2006.01)
*G06K 9/00* (2006.01)

(52) U.S. Cl.
CPC .. *G06F 17/30256* (2013.01); *G06F 17/30598* (2013.01); *G06F 17/30705* (2013.01); *G06K 9/00221* (2013.01); *G06K 9/00335* (2013.01)

(58) Field of Classification Search
CPC ............... G06F 17/30598; G06F 17/30705
USPC .................................................. 707/737, 758
See application file for complete search history.

(56) References Cited

U.S. PATENT DOCUMENTS

| | | | | |
|---|---|---|---|---|
| 8,751,407 B1* | 6/2014 | Murray | ............... | G06Q 30/02 705/1.1 |
| 2011/0047384 A1* | 2/2011 | Jacobs | ............ | G06K 9/00221 713/176 |
| 2011/0088002 A1* | 4/2011 | Freer | .................. | G06F 3/017 715/863 |
| 2012/0079022 A1* | 3/2012 | Kim | ................... | G06Q 50/01 709/204 |
| 2012/0276929 A1* | 11/2012 | Park | ................. | G06Q 10/10 455/456.3 |
| 2013/0196757 A1* | 8/2013 | Latta | ................ | A63F 13/211 463/31 |
| 2014/0188990 A1* | 7/2014 | Fulks | ............... | H04L 65/403 709/204 |
| 2014/0297742 A1* | 10/2014 | Lyren | ............... | H04L 65/403 709/204 |

OTHER PUBLICATIONS

Mayrhofer et al., "Shake Well Before Use: Authentication Based on Accelerometer Data", Published 2007.

* cited by examiner

*Primary Examiner* — Joshua Bullock
(74) *Attorney, Agent, or Firm* — IP Spring

(57) ABSTRACT

Implementations generally relate to creating groups in a social network system. In one implementation, a method includes identifying at least one person that is proximate to a target user in a social network system, determining that the target user is generating a pattern; recognizing the at least one person proximate to the target user who is generating the pattern; creating a group in the social network system, and the group includes the at least one person generating the pattern; and associating the group with the target user.

20 Claims, 12 Drawing Sheets

CREATING SOCIAL NETWORK GROUPS

TECHNICAL FIELD

Implementations relate generally to social network systems, and more particularly to creating groups in a social network system.

BACKGROUND

Social network systems typically enable users to create social network groups. For example, such social network groups may include groups of friends or groups of contacts. To create a group, a user of a social network system typically finds other users by performing a search, and then invites them to connect socially as friends or as contacts. A recipient of an invitation can respond by accepting the invitation, which creates a social connection. Once the social connection is made, the users can belong to each other's groups and can engage via various social activities. For example, users can visit each other's profile pages, follow each other's posts, send messages to each other, etc.

SUMMARY

Implementations generally relate to creating groups in a social network system. In one implementation, a method includes identifying at least one person that is proximate to a target user in a social network system, determining that the target user is generating a pattern; recognizing the at least one person proximate to the target user who is generating the pattern; creating a group in the social network system, wherein the group includes the at least one person generating the pattern; and associating the group with the target user.

With further regard to the method, in one implementation, the recognizing of the at least one person proximate to the target user is generating the pattern, includes applying a pattern recognition algorithm to the pattern. In one implementation, the method includes enabling the target user to verify that the at least one person recognized as generating the pattern, is correctly recognized.

With further regard to the method, in one implementation, the pattern is based at least in part on a rhythmic pattern. In one implementation, the pattern is based at least in part on a repeated motion. In one implementation, the pattern is based at least in part on a gesture. In one implementation, the pattern is based at least in part on a sound. In one implementation the method also includes applying a frequency recognition algorithm to the pattern. In one implementation, the method includes providing the group to the target user. In one implementation, the method includes notifying the at least one person recognized that the group has been created. In one implementation, the method includes sending an invitation to join the group to the target user and to the at least one person recognized.

In another implementation, a system includes one or more processors, and logic encoded in one or more tangible media for execution by the one or more processors. When executed, the logic is operable to perform operations including: a method includes identifying at least one person that is proximate to a target user in a social network system, determining that the target user is generating a pattern; recognizing the at least one person proximate to the target user who is generating the pattern; creating a group in the social network system, the group includes the at least one person generating the pattern; and associating the group with the target user.

With further regard to the system, in one implementation, to recognize the at least one person, the logic when executed is further operable to perform operations comprising applying a pattern recognition algorithm to the pattern. With further regard to the system, in one implementation, the logic when executed is further operable to perform operations enabling the target user to verify that the at least one person recognized as generating the pattern is correctly recognized. With further regard to the system, in one implementation, the pattern is based at least in part on a rhythmic pattern. In one implementation, the pattern is based at least in part on a repeated motion. In one implementation, the pattern is based at least in part on a gesture. In one implementation, the pattern is based at least in part on a sound. In one implementation, the system also includes applying a frequency recognition algorithm to the pattern.

DETAILED DESCRIPTION

Implementations described herein facilitate the creation of social network groups in a social network system. In various implementations, a system generates groups for users of the social network system in response to patterns associated with the users. For example, the system may generate a group that includes friends generating patterns.

As described in more detail below, in one implementation, the system identifies at least one person that is physically proximate to a target user in a social network system. For example, acquaintances or friends may be standing next to a target user at a social gathering (e.g., a party), and the target user wishes to share information, such as a video they just took with their friends. Target user may wish to form a social network group to share the video, announce this to users nearby (e.g., "share my bounce"), and start generating a pattern of movement. For example, target user may be bobbing or bouncing his or her head up and down repeatedly in a rhythmic manner. The system then determines that the target user is generating a pattern of movement or movements.

The system then recognizes the at least one person proximate to the target user who is generating the pattern. For example, friends standing next to the target user may wish to join the created social network group and start bobbing or bouncing their heads up and down repeatedly in the same rhythmic manner as the target user. In one implementation, the recognizing is based at least in part on applying a pattern recognition algorithm to the pattern. The system then enables the target user to verify that the at least one person recognized as generating the pattern is correctly recognized. For example, the target user may verify that a friend is bobbing his or her head up and down in the same rhythmic manner in synchronization or entrainment with target user. The system then creates a social network group that includes the at least one person generating the pattern, and then associates the group with the target user. Target user may then share the video with friends who are now part of the group.

Figure 1:
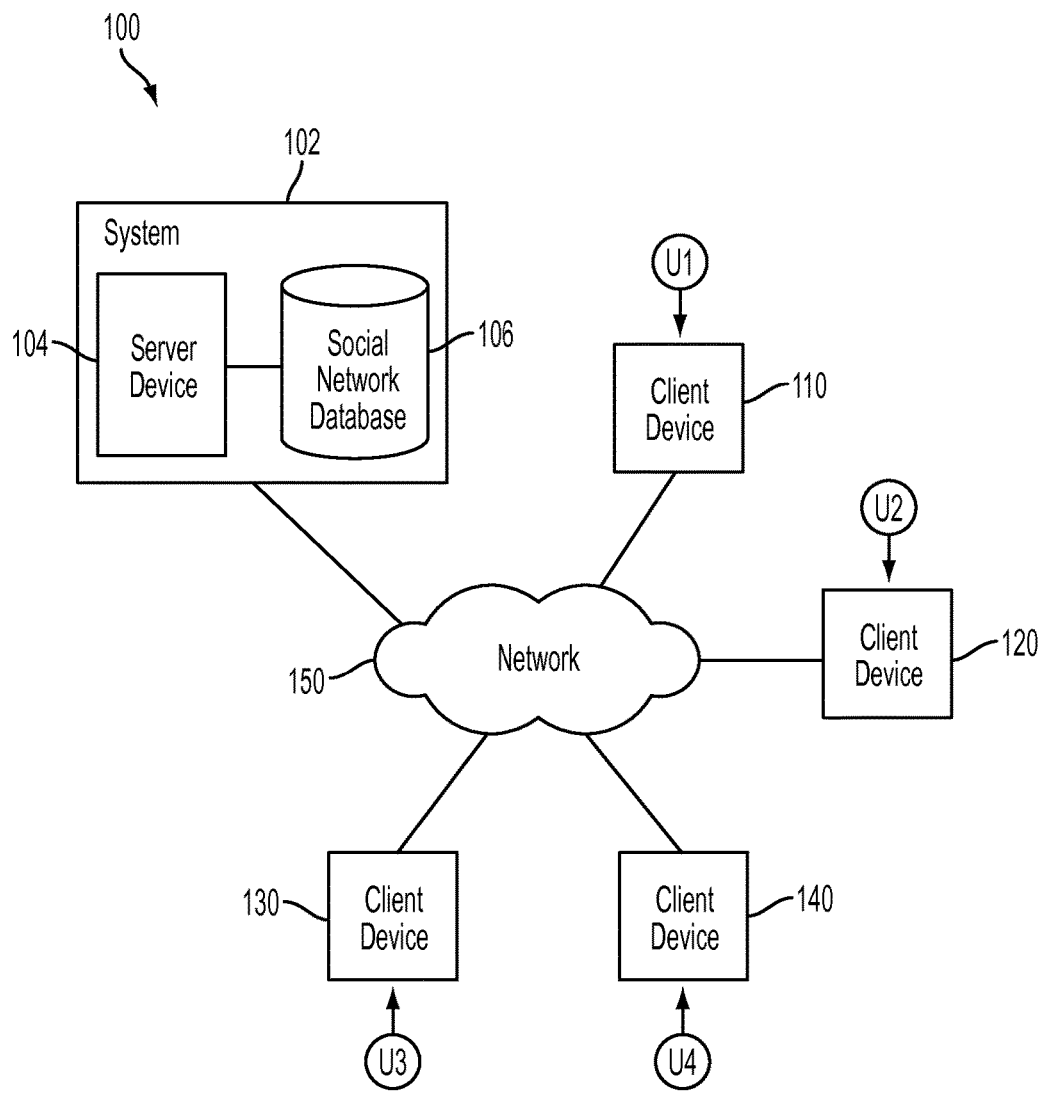
FIG. 1 illustrates a block diagram of an example network environment, which may be used to implement the implementations described herein.

FIG. 1 illustrates a block diagram of an example network environment 100, which may be used to implement the implementations described herein. In one implementation, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may collaborate with each other in creating social network groups using respective client devices 110, 120, 130, and 140. Users U1, U2, U3, and U4 may also use respective client devices 110, 120, 130, and 140 to take photos and/or capture videos. In various implementations, client devices 110, 120, 130, and 140 may include any types of electronic devices such as mobile phones (e.g., smart phones), tablets, notebook computers, desktop computers, digital cameras, etc. Such client devices 110, 120, 130, and 140 that are not dedicated digital cameras may include integrated digital cameras and/or video cameras.

In some implementations, client devices 110, 120, 130, and 140 may include wearable computers or computing devices, including any hands-free devices. For example, in some implementations, one or more client devices may include devices that operate with a head-mounted camera, head-mounted eye tracking device, and/or head-mounted display (e.g., HMD). The wearable computer may be implemented, for example, as an integrated device (e.g., glasses) or in other implementations aspects may be implemented in a head-mounted display (e.g., glasses) and other aspects may be implemented in other devices (e.g. watches, jewelry, items carried in pocket, mobile devices, etc.).

For ease of illustration, four example users U1, U2, U3, and U4 are described. There may be any number of users collaborating to create social network groups. For ease of illustration, four respective example client devices 110, 120, 130, and 140 are described. There may be any number of respective client devices to create social network groups.

Figure 2:
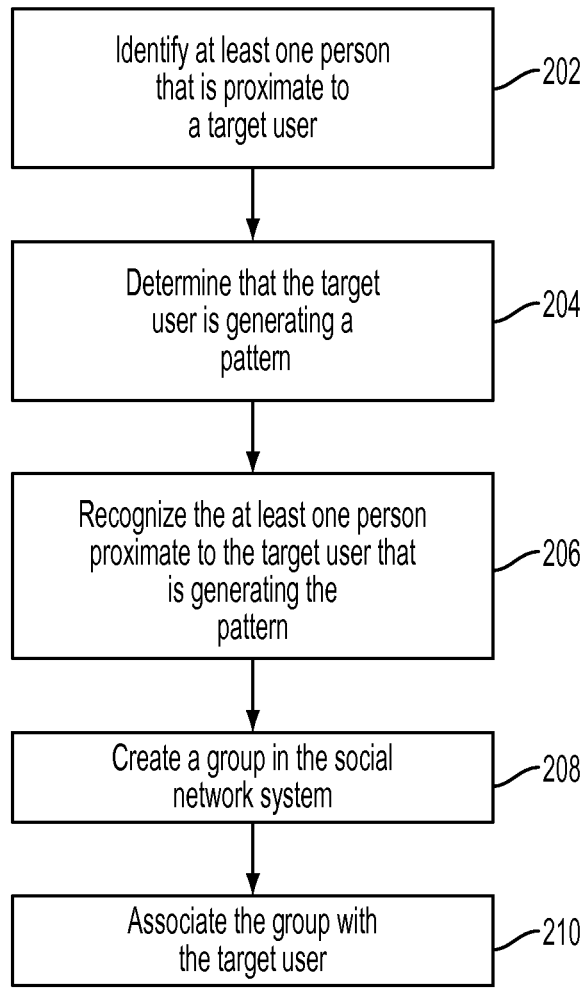
FIG. 2 illustrates an example simplified flow diagram for creating groups in a social network system, according to one implementation.

FIG. 2 illustrates an example simplified flow diagram for creating groups in a social network system, according to one implementation. Referring to both FIGS. 1 and 2, a method is initiated in block 202, where system 102 identifies at least one person that is proximate to a target user in the social network system. For example system 102 may determine that target user's friends or some acquaintances are standing near target user at a social gathering (e.g. a party).

In some implementations, proximity may be based on the proximity of client devices 110, 120, 130, and 140. System 102 may establish proximity based on Wi-Fi connection signals, GPS signals, cellular triangulation signals, NFC signals, Bluetooth signals, and/or ZigBee signals. In one implementation, system 102 may establish proximity based on users check-in data. In some implementations, the proximity may be based on a predetermined distance measurement between respective devices. In various implementations, system 102 may establish proximity based on audio fingerprinting among devices. The foregoing are non-limiting example methods of establishing proximity, however, system 102 may use any suitable method to establish proximity, or combinations of methods.

Referring to FIGS. 1 and 2, in block 204 system 102 determines that the target user is generating a pattern. In some implementations, target user may initiate generating pattern, because target user wishes to quickly and efficiently create a social network group to share information (e.g., photos) with nearby users. In some implementations, target user may utilize user interface on client device to indicate they have initiated generating a pattern. In an example implementations, target user may indicate they are generating a pattern using a predetermined voice input (e.g., "join my bounce"). In various implementations, system 102 may determine without target user input that target user is generating pattern. For example, a pattern may be the target user making a distinctive motion such as tilting their head from side to side, hugging someone or kissing them on the cheek, winking, nodding, etc. In some implementations, system 102 may recognize that target user is generating a pattern without target user input based on a stored predetermined pattern that indicates target user is generating the pattern.

In one implementation, system 102 may determine that the target user is generating the pattern. In some implementations, system 102 may detect that the target user is generating the pattern based in part on motion information associated with the target user. In various implementations, client devices 110, 120, 130, and 140 may be implemented with a motion capturing device to obtain motion information associated with the target user. As described in more detail below, such a motion capturing device may be any suitable electronic device that may capture and/or measure aspects of motion information, such as translation, rotation, pitch, yaw, roll, frequency, entrainment, or any combination thereof.

Non-limiting examples of motion capturing devices may include a camera, accelerometer, microphone, gyroscope, compass, magnetometer, sensor, orientation sensor, motion detector, GPS device, or any other suitable electronic device or combination of the foregoing devices that may be used to capture motion information. In some situations, a given client device may automatically use a motion capturing device to determine that target user is generating the pattern.

In an example implementation, a target user is using a given client device that includes a motion capturing device (e.g., a wearable computer). The target user may be tilting his or her head from side to side; and system 102 may receive motion information and determine that target user is forming a pattern, by tilting their head from side to side.

In some implementations, a given client device may include a motion capturing device that implements an accelerometer, in part, to capture motion information. In various implementations, accelerometer may capture motion information by detecting acceleration data associated with given client device of target user, and generate corresponding pattern maps. For example, system 102 may generate a pattern map for a given repeated motion of a target user tilting their head from side to side, and the pattern map may based in part on acceleration data.

In various implementations, a pattern map is a set of distinguishing motions or actions, which include any motions or actions that make a pattern recognizable. Such motions or actions may include, for example: gestures, head movements, hand gestures, symbols, signs, body movements, sounds, tunes, auditory actions, etc. System 102 may store pattern maps locally in a given client device or upon a given server or system of servers for use or analysis. In some implementations, a gesture may be a secret sign or gesture known only to select predetermined users.

In various implementations, an accelerometer may provide force measurements in various directions. For example, force measurements may be in three directions, an x direction, a y direction, and a z direction. System 102 may use force measurements to determine values for parameters such as acceleration, force, direction, amplitude, and position. Pattern maps may be based in part on values for parameters or combinations of parameters that correspond to motions in a given direction over a given time. For example, system 102 may create a pattern map that correlates to parameters from accelerometer based on the motion of a target user's head tilting force measured at a certain amplitude, determined in a given direction, taken over a given time (e.g. the target user tilts their head forcefully to their left shoulder three times over a period of ten seconds).

In some implementations, system 102 may include a motion capturing device that implements a gyroscope, in part, to capture motion information. In various implementations, gyroscope may capture motion information by detecting rotation data and provide corresponding pattern maps (e.g. a pattern map for the repeated motion of a target user rotating their head from right to left) that is based in part on rotational data.

In some implementations, a given client device may include a motion capturing device that implements a compass, in part, to capture motion information. In various implementations, a compass may capture motion information by detecting directional data from a compass based on given motions of a user with respect to magnetic north. For example, the target user may be making a given motion of twisting from a north facing direction to a west facing direction, and then twisting back to north facing direction. In various implementations, a compass may capture motion information by detecting directional data, and then provide corresponding pattern maps (e.g. a pattern map for a user twisting relative to magnetic north) that are based in part on motions associated with directional data. For example a pattern map may include the motion of the target user twisting from north to west and then back to north again.

In an example implementation, system 102 may use a motion capturing device that implements a camera (note the term camera and video camera are used interchangeably herein) to capture motion information. In an example implementation, the camera may be integrated with a wearable computer so that the camera captures video and images in the same field of view as the user of the wearable computer. In various implementations, a camera may capture motion information by detecting gestures and/or signs made by the target user. Camera may for example capture, a single image, a series of sequential images, or video, etc. For example, a camera may detect the target user's gesture of waving his or her hands in a distinctive manner. In other implementations, a camera may detect a target user gesturing a distinctive sign such as a "thumbs up." System 102 may create pattern maps based on captured motions that include the gestures and/or signs made by the target user. For example, system 102 may create a pattern map that corresponds to a target user gesture of waving his or her hands back and forth three times or doing a special handshake.

System 102 may use a single motion capturing device or any combination of multiple motion capturing devices (e.g., accelerometer, gyroscope, camera, microphone, etc.) to capture motion information.

Referring to FIGS. 1 and 2, in block 206 system 102 recognizes that at least one person proximate to the target user who is generating the pattern. For ease of illustration the at least one person proximate to the target user is referred to as a user or in the case of multiple people users. In one implementation, to recognize that the pattern generated by the user is the pattern, system 102 applies a pattern recognition algorithm to a given pattern generated by the user.

In one implementation, system 102 generates a pattern map that corresponds to motions or actions that correspond to a given pattern generated by a user. For each given pattern generated by a user, system 102 compares pattern map of the identified pattern to multiple pattern maps of known patterns in a database such as social network database 106 of FIG. 1. Each known pattern is associated with a user having a known user profile in social network database 106.

In one implementation, social network database 106 stores images of known patterns, where each known pattern is associated with a pattern map. In some implementations, each known pattern may be associated with a known user of the social network system. For example, the known pattern is associated with a known user profile.

In various implementations, each pattern map is associated with a pattern map score, and system 102 compares a pattern map score of pattern map generated by a user to pattern map scores associated with known patterns. In one implementation, system 102 may look up pattern maps of known patterns in a hash table. In one implementation, system 102 determines the candidate with the closest pattern map (to that of the identified pattern) to be the same pattern.

In one implementation, the pattern map (of the candidate) with the highest pattern map score has the highest probability of being associated with a known user. Conversely, the pattern map with the lowest pattern map score has the lowest probability of being associated with a known user.

In some situations, there may be multiple candidates (e.g., 5 users generating patterns) with closely matching pattern maps. In other words, there may be several users who are generating patterns that look like the pattern being generated by the target user.

In block 208, system 102 enables the target user to create a group in the social network system, and the group may include at least one person generating the same pattern associated with the target user. In some implementations target user may wish to create a temporary or ephemeral group for the purpose of sharing information (e.g., photos) with nearby users at a social gathering. In various implementations, system 102 enables users generating patterns to opt-in or opt-out of system 102 adding them to newly created groups generally and/or to groups associated with particular users of the social network system.

A "group" as used in the context of the implementations described herein is a social network group. As such, the term "group" may be used interchangeably with the phrase "social network group." In various implementations, a social network group may be a set of socially connected users in the social network. For example, a social network group may be a group of friends or a group of connections.

In one implementation, system 102 may create a group based on multiple proximate users generating respective given patterns. For example, if two users attend an event and each generates patterns, system 102 may combine the users generating the same patterns to create a social network group.

In one implementation, the one or more groups may include the target user, because the target user starts generating a pattern and system 102 then stores a pattern map for this target user pattern as a pattern. In one implementation, the one or more groups include at least one user proximate the target user who is recognized as generating the same pattern. For example, a given group may include at least one person recognized as generating the pattern and the target user who initiated generating the pattern. In one implementation, the one or more groups may include multiple users recognized as generating the same pattern as the target user.

In one implementation, system 102 may label each created group. The label may be a random number, date, location, etc. System 102 also enables the target user to change the label.

In one implementation, system 102 enables the target user to verify that proximate users recognized as generating the pattern are correctly recognized. In one implementation, system 102 causes profile photos of recognized users to be displayed in association with the created group. In an example implementation, system 102 may prompt target user to accept or deny given users as group members. In one implementation, other users in the group may also verify that the other people recognized as creating the pattern are correctly recognized.

In one implementation, system 102 enables the target user to modify identification information associated with one or more people in the group if any person is incorrectly recognized. For example, system 102 may enable target users to manually delete or remove names from the group. In some implementations, system 102 may enable the target users to manually add names to the group.

In one implementation, if a person generating the pattern is not recognized, system 102 may include a placeholder (e.g., an empty box) in the group. System 102 may prompt target user to manually fill in identifying information for that person. The target user can then determine which users are not yet listed in the group. The target user also has the option of removing the placeholder.

In block 210, system 102 associates the one or more groups with the target user. In one implementation, system 102 may provide the group to the target user (for example, notify the target user that the group has been created). In various implementations, system 102 may enable the target user to include the one or more groups in a list or cluster of existing groups associated with the target user (e.g., associated with the profile of the target user). System 102 may cause the list or cluster of groups to be displayed to the target user in the social network webpages of the target user. System 102 may enable the target user to elect whether to make each group associated with the target user visible to other users, and, if visible, may enable the target user to indicate which other users are permitted to view each group.

In one implementation, system 102 notifies the proximate users creating the pattern that the group has been created. As noted above, in various implementations, system 102 enables recognized people to opt-in or opt-out of system 102 adding them to newly created groups generally and/or to groups associated with particular users of the social network system.

In one implementation, system 102 may send an invitation to join the group to the target user and to the users recognized as generating the pattern. In such implementations, recipients of such invitations may have the option to accept or not accept the invitations. If a given recipient accepts the invitation, that user would join the group and be associated with the group.

In one implementation, system 102 enables users to associate assets with the group. Such assets may include content, for example, photos, documents, emails, messages, audio tracks, event information, posts, videos, images, etc. Users who are included in the group may then access such assets.

Figure 3A:
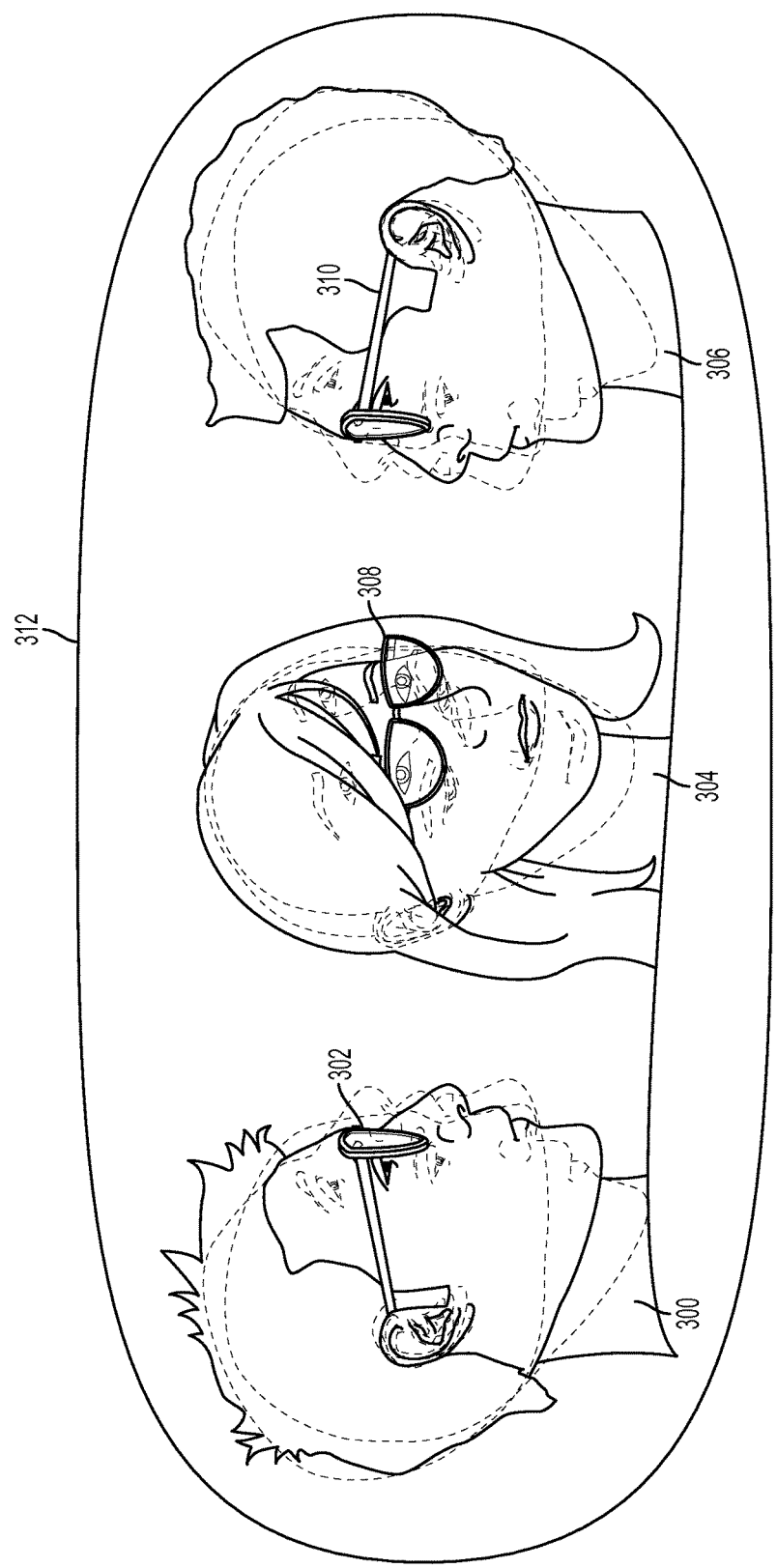
FIG. 3A illustrates an example scenario for recognizing users creating patterns, according to one implementation.
Figure 3B:
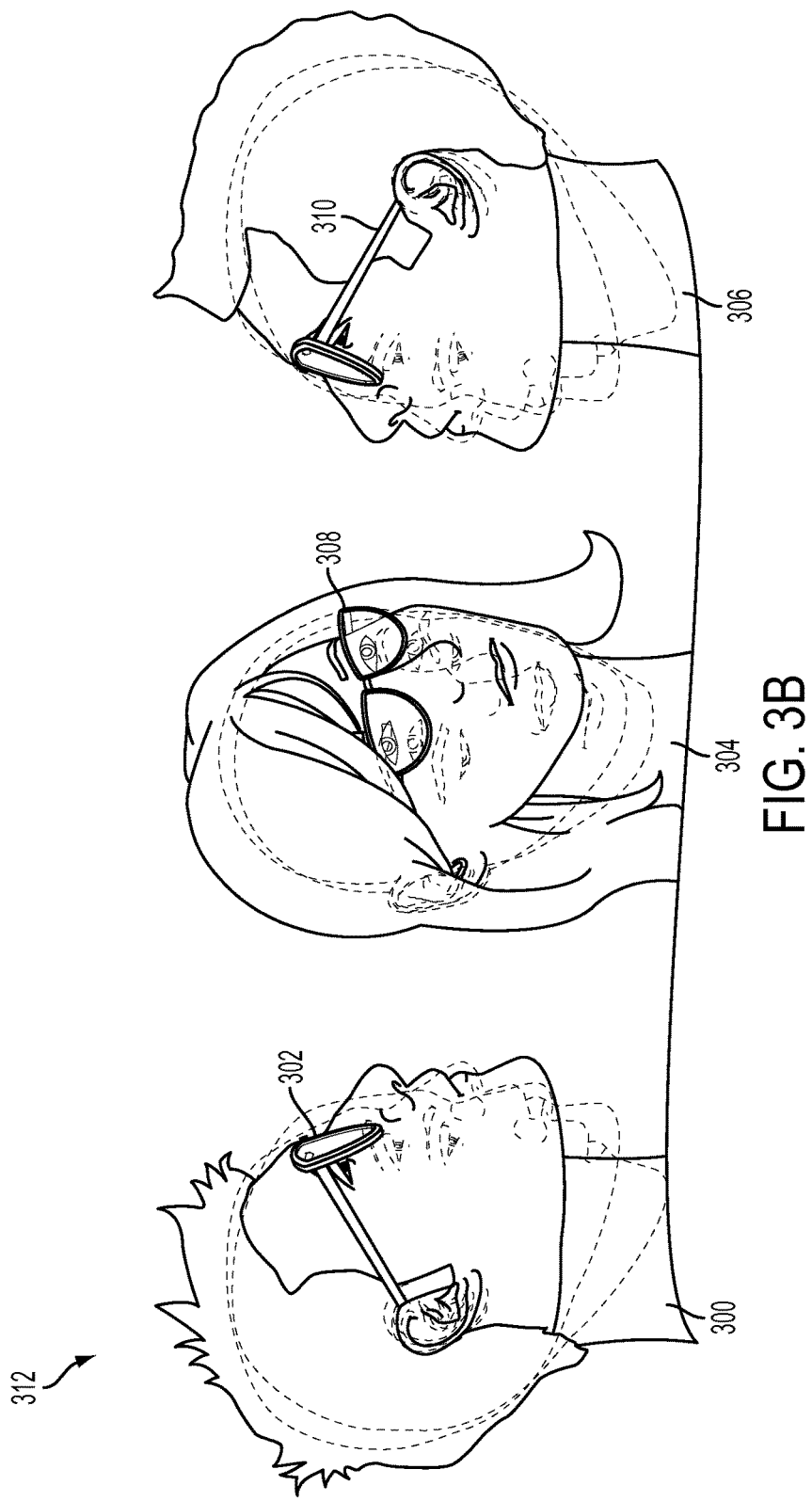
FIG. 3B illustrates an example scenario for recognizing users creating patterns, according to one implementation.
Figure 3C:
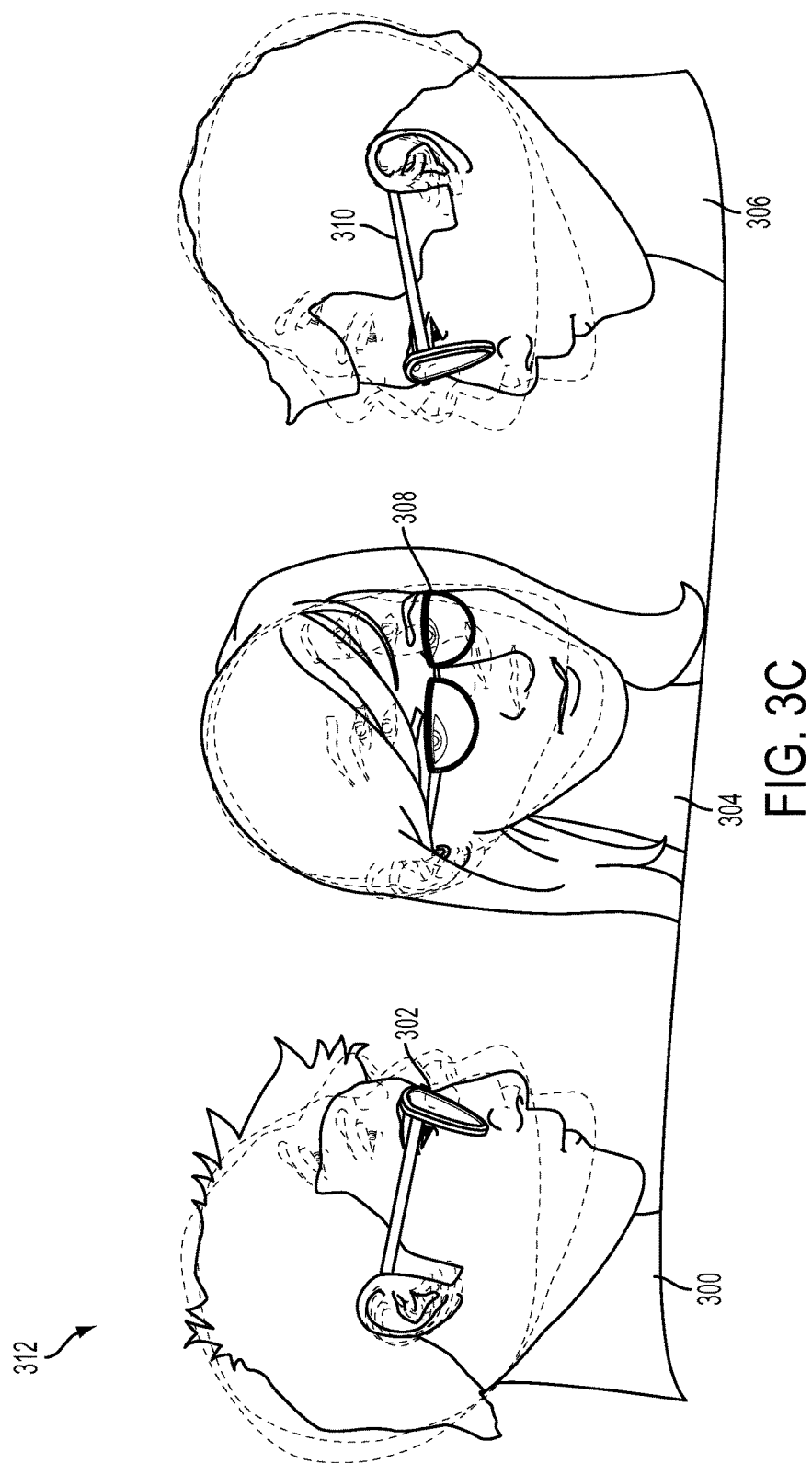
FIG. 3C illustrates an example scenario for recognizing users creating patterns, according to one implementation.

FIGS. 3A-3C, illustrate an example scenario for recognizing users creating patterns, according to one implementation. In one scenario, assume user 300 is target user 300 who is using a given client device and a wearable computer 302. In this example scenario, users 304 and 306 are proximate target user 300 and are wearing respective client devices 308 and 310. For example target user 300 and users 304 and 306 may be attending a social gathering (e.g., an event). Target user 300 may have captured an image using a camera on wearable computer 302 and wish to share this image with users 304 and 306.

In an example implementation, target user initiates the formation of a social network group by announcing to nearby users, "share my bounce." Target user 300 is depicted as generating a pattern that is a rhythmic pattern, by bobbing his head up and down (e.g., bouncing). For purposes of illustration three head positions are shown, neutral (FIG. 3A), up (FIG. 3B), and down (FIG. 3C). FIG. 3A depicts target user 300 with his head in a neutral position and shows up and down positions in dotted lines. In an example implementation, target user 300 begins at a neutral position as shown in FIG. 3A and then starts rhythmically bobbing his head between up position depicted in FIG. 3B and down position depicted in FIG. 3C.

In an example implementation, system may use wearable computer 302 to capture motion information associated with the target user's rhythmic head bobbing or bouncing. For example, wearable computer 302 may include a motion capture device (e.g. accelerometer) that detects acceleration associated target user's 300 head motion. System 102 may then generate a corresponding pattern map based in part on acceleration data provided by accelerometer, pattern map corresponds to the distinct motion of target user's 300 head bobbing. In some implementations pattern map may include the frequency of target user's bouncing.

In some implementations users 304 and 306 proximate target user 300 may wish to join target user's 300 newly created group and respond to target user's 300 announcement to "join my bounce" and target user's bouncing. Users 304 and 306 may begin rhythmically bobbing their heads up and down to effectively create the same pattern as target user. Users 304 and 306 may gradually entrain or fall into synchronization with target user's 300 motion. 300. Users 304 and 306 may be wearing wearable computers 308 and 310 that may each include a motion capture device (e.g. accelerometer) that detects acceleration and frequency associated with users 304 and 306 head motion. In various implementations, system 102 may then generate corresponding pattern maps based in part on acceleration data and frequency data provided by users' 304 and 306 associated motion capture device.

Referring to FIG. 3A, in various implementations system 102 then applies a pattern recognition algorithm to recognize that users 304 and 306 are generating the same pattern as user 300. For example, system 102 may use pattern recognition algorithm that determines users 304 and 306 are generating the same pattern based in part on frequency and phase coherence. System 102 then enables target user 300 to create a social network group 312, notifies target user 302 that social network group 312 has been created, enables target user 300 to invite users 304 and 306 to social network group 312, and shares assets (e.g. photos) with social network group 312. System 102 also notifies users 304 and 306 that social network group 312 has been created; and they may then opt to join or not join social network group 312.

In some implementations, another person at the party may be lurking nearby and wish to join the social network group 312. An advantage of the system 102 is that the lurker is visible to target user 300. Accordingly, even if the lurker generates the same pattern (e.g. bobs his head rhythmically like target user 300) target user 300 can visually identify who the lurker is, and opt to not invite the lurker to social network group 312.

Figure 4A:
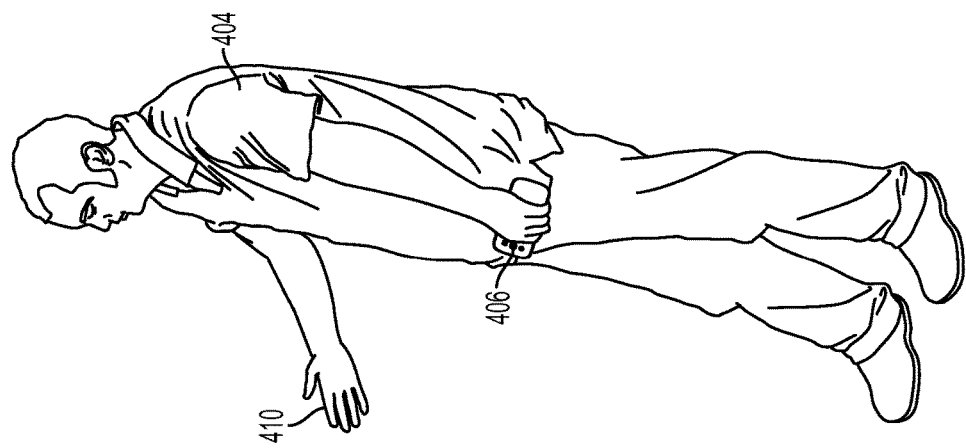
FIG. 4A illustrates an example scenario for recognizing users creating patterns, according to one implementation.
Figure 4A:
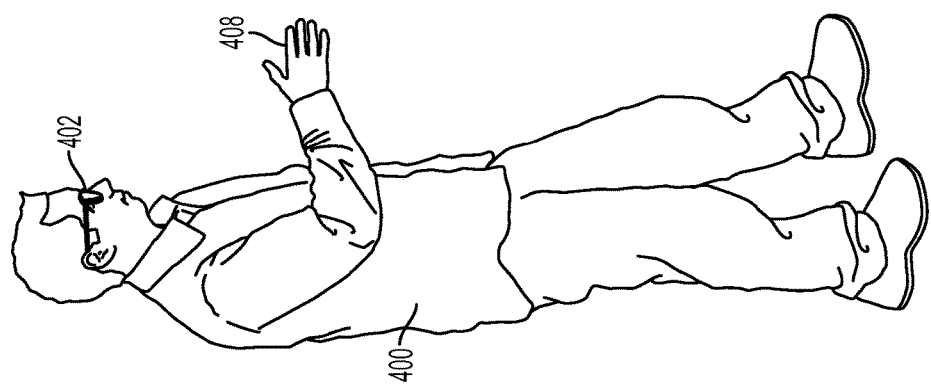
Figure 4B:
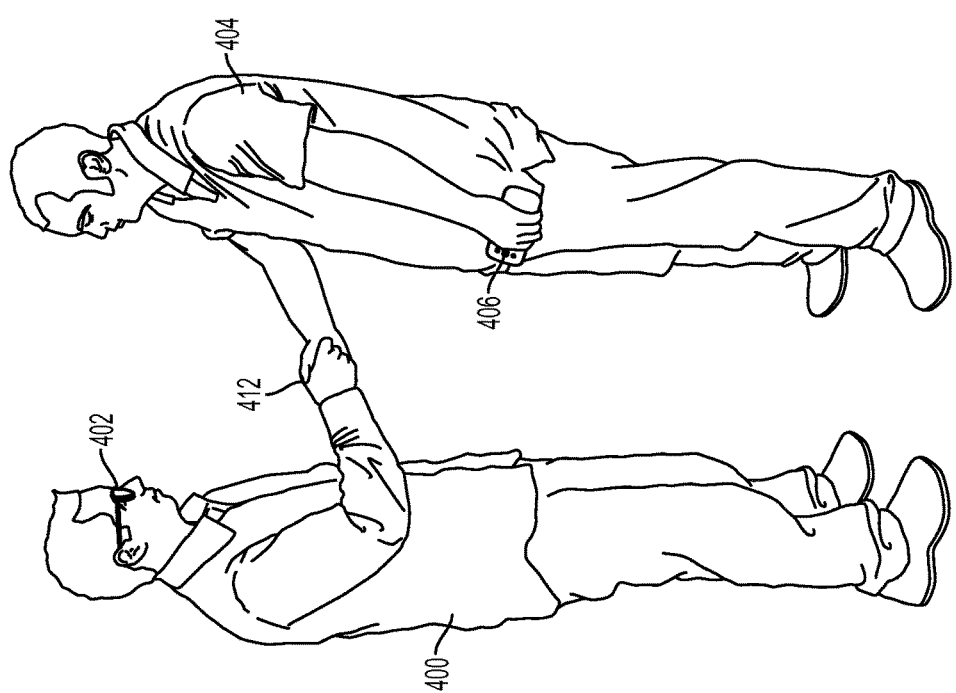
FIG. 4B illustrates an example scenario for recognizing users creating patterns, according to one implementation.

FIGS. 4A-4B, illustrate another example scenario for recognizing users who are creating patterns, according to one implementation. In another scenario, assume target user 400 is using a given client device 402. In this example scenario, user 404 is proximate target user 400 and is using client device 406 (e.g., a smartphone). Target user 404 and user 406 may be attending a conference. Target user 400 may wish to share contact information with user 404.

In an example implementation, target user 400 is depicted as generating a pattern that is a gesture, by extending his hand 408 towards the hand 410 of user 404 (e.g., a handshake). In some implementations system may indicate by voice or other action that they wish to create a group (e.g., "hi I'd like to create a group so we can share contact info, if we shake hands I will create the group and invite you"). In some implementations, system 102 may create group without target user input based on the stored predetermined pattern that indicates target user wishes to create group (e.g., gesture of handshake initiated by target user indicates target user wishes to create a temporary group to share contact info). In some implementations when users mimic this gesture, system 102 will then invite users to the group. In an example implementation, target user 400 begins the gesture as shown in FIG. 4A by extending his hand towards user 404 and completes the gesture by clasping 412 the hand 410 of user, as depicted in FIG. 4B.

In an example implementation, system 102 may use wearable computer 402 to capture motion information associated with target user's gesture. System 102 may then generate a corresponding pattern map based in part on motion data provided by any suitable electronic device (e.g. camera) that corresponds to the distinct motion of target user's 400 gesture of a handshake.

User 404 may form the same pattern as target user 400, by making the same gesture and extending his hand 410 to shake hands with target user 400. User 404 is holding a client device 406 that includes a motion capture device that detects motion information such as the user 404's gesture of a handshake. System 102 then generates a corresponding pattern map based in part on motion data provided by the motion capture device in user's 404 client device 406.

System 102 then applies a pattern recognition algorithm to recognize that target user 400 and user 404 are generating the same pattern (e.g., shaking hands). System 102 then enables target user 400 to create a social network group, notifies target user 400 that social network group has been created, enables target user 400 to invite user 404 to social network group, and share assets (e.g., contact information) with social network group that includes user 404. System also notifies user 404 that social network group has been created. In an example implementation, target user 404 could shake hands with multiple people at the conference, create a social network group with people they shook hands with, invite them all to the social network group, and share and exchange their contact information with all the members of the social network group.

Figure 5A:
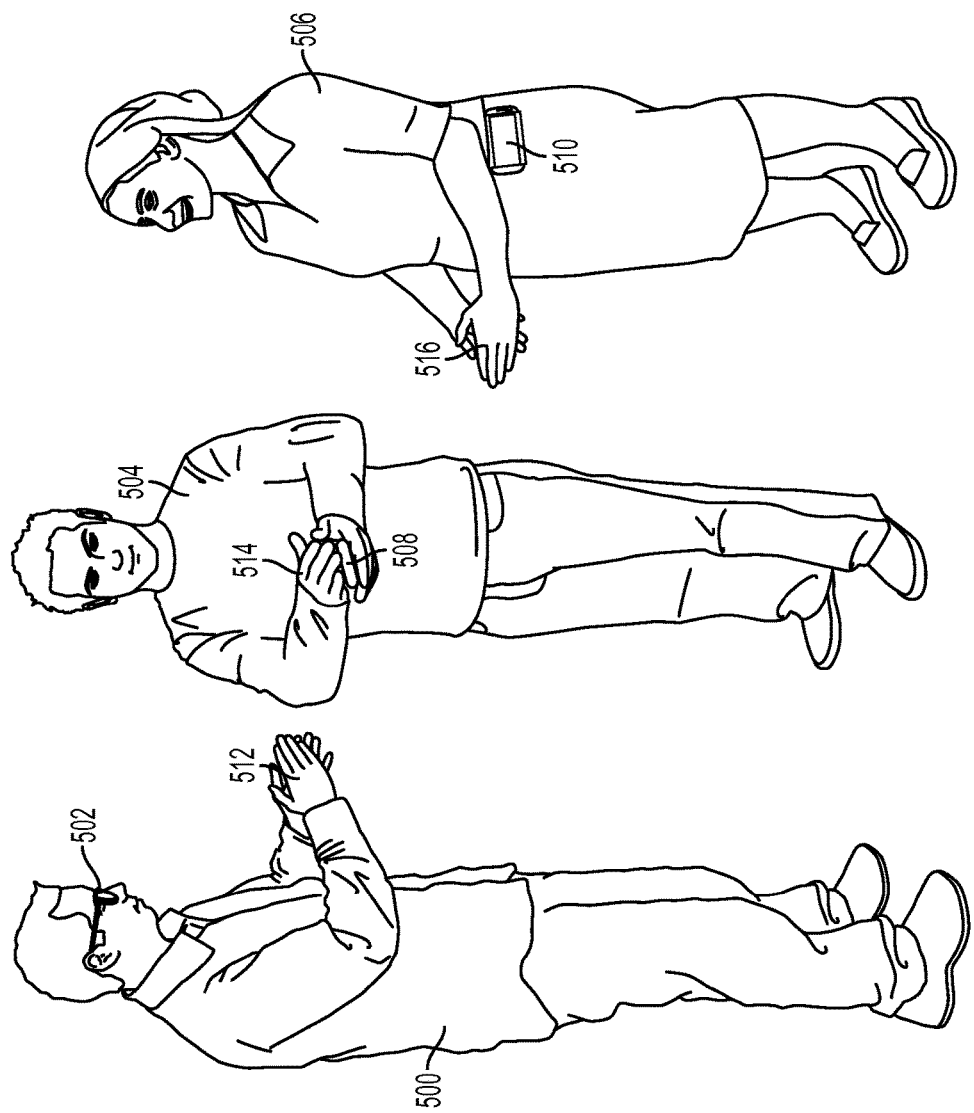
FIG. 5A illustrates an example scenario for recognizing users creating patterns, according to one implementation.
Figure 5B:
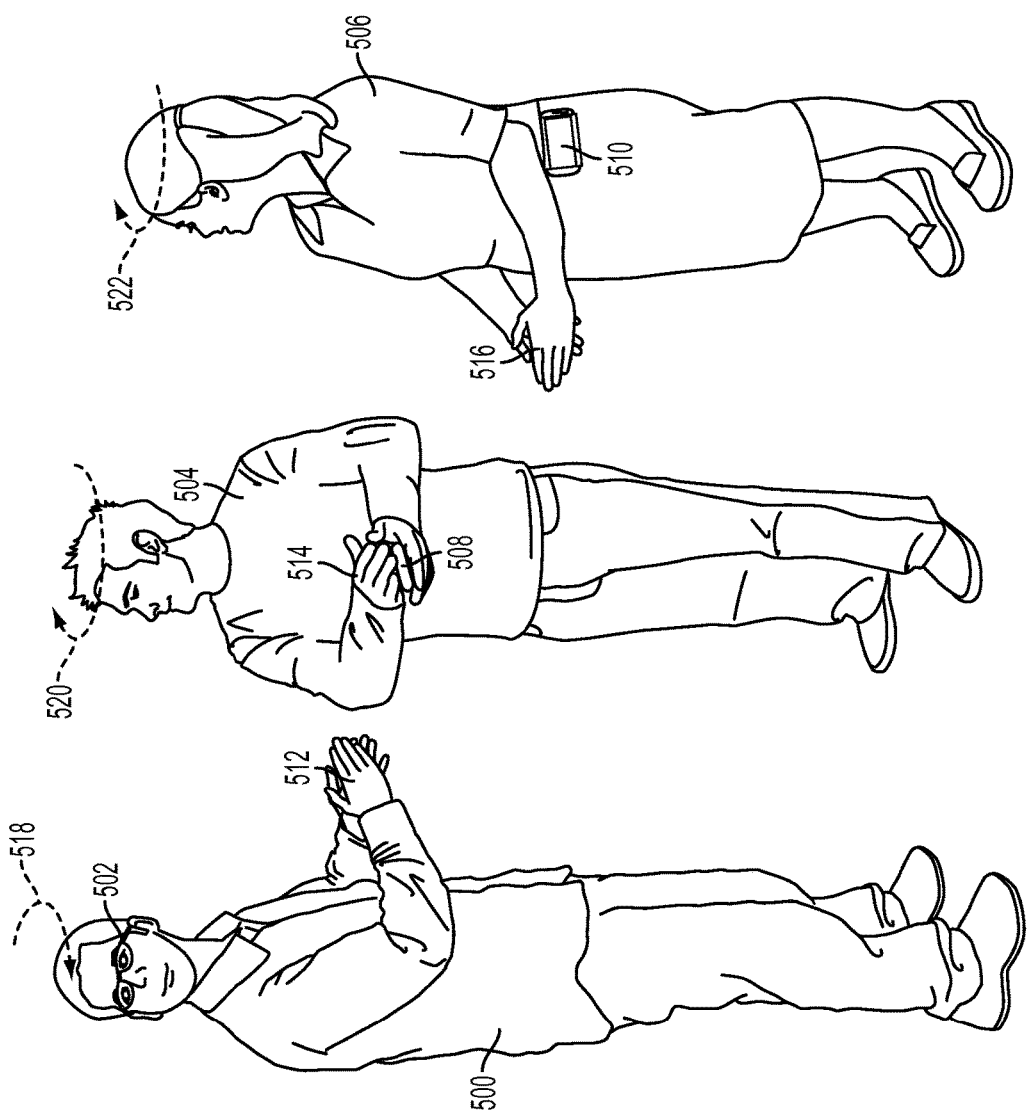
FIG. 5B illustrates an example scenario for recognizing users creating patterns, according to one implementation.
Figure 5C:
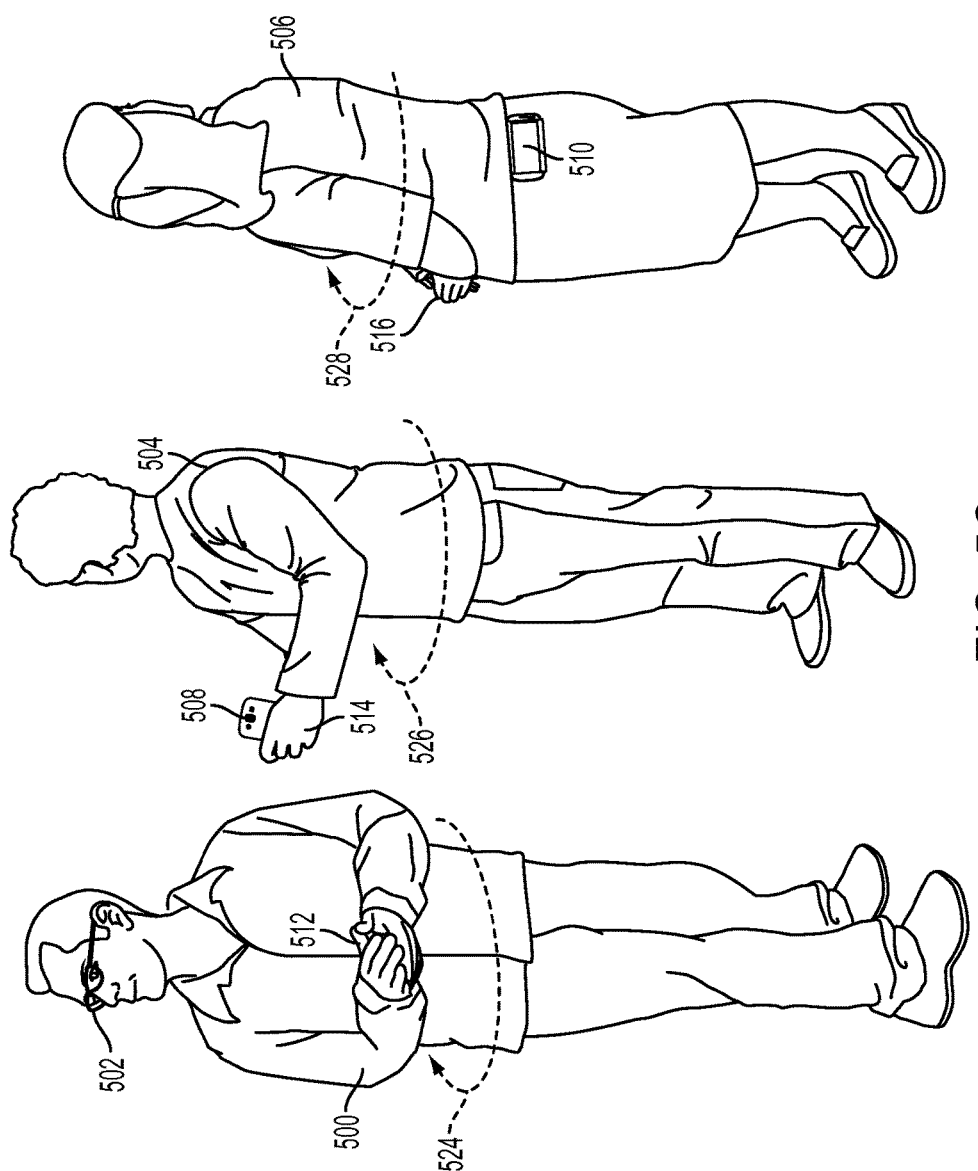
FIG. 5C illustrates an example scenario for recognizing users creating patterns, according to one implementation.

FIGS. 5A-5C, illustrate an example scenario for recognizing users creating patterns, according to one implementation. In one scenario, target user 500 is using a given client device that is a wearable computer 502. In this example scenario, users 504 and 506 are proximate target user 500, and are using respective client devices, a smart phone 508, and a tablet 510. Target user 500 and users 504 and 506 may be attending a social gathering (e.g., an event). Target user 500 may have captured a video using a camera on wearable computer 502 and wish to share this video with users 504 and 506. In an example implementation, target user 500 wishes to create a temporary group to share this video, and initiates this by announcing to users 504 and 506, "hey follow my lead to join my group.").

In some implementations, target user may then start making a distinct series of movements (e.g., dance movements). Referring to FIGS. 5A-5C, in an example implementation target user 500 is depicted as generating a pattern as follows. In a step depicted in FIG. 5A, target user 500 claps his hands together 512. In another step, depicted in FIG. 5B, target user 500 turns his head in the direction of arrow 518 to look generally over his shoulder. In another step, depicted in FIG. 5C, target user 500 twists his torso in the direction of arrow 524. Target user 500 may perform the foregoing steps in any particular order, combination, and frequency to generate the pattern.

In an example implementation, system 102 may use wearable computer 502 to capture motion information associated with target user's 500 pattern. For example, wearable computer 502 may include a motion capture device (e.g. accelerometer) that detects acceleration associated with target user's hand clapping gesture. Motion capture device may include a gyroscope that detects the turning of target user's 500 head in the direction of arrow 518. The motion capture device may include a compass that detects the twisting of target user's 500 torso from magnetic north to some degree of movement from magnetic north. System 102 may also capture the frequency and/or amplitude of one or more of the foregoing movements.

In some implementations users 504 and 506 proximate target user 500 may begin to generate the same pattern as target user 500. In an example implementation, users 504 and 506 fall into synchronization with target user's 500 movements. For example, as depicted in FIG. 5A users 504 and 506 may clap their hands together 508 and 516. As depicted in FIG. 5B, users 504 and 506 may turn their heads in the direction of arrows 520 and 522 respectively. Referring to FIG. 5C, users 504 and 506 may twist their torsos in the direction of arrows 526 and 528. System 102 may then generate pattern maps of users' 504 and 506 patterns, by using motion information obtained from motion capture devices on smartphone 508 and tablet 510.

In various implementations, system 102 then applies a pattern recognition algorithm to recognize that users 504 and 506 are generating the same pattern as user 500. In an example implementation, pattern recognition algorithm uses frequency and phase coherence of users 504 and 506 motions to determine users 504 and 506 are generating the same pattern as user 500. System 102 then enables target user 500 to create a social network group, notifies target user 500 that the group has been created, enables target user 500 to invite users 504 and 506 to group, and share assets (e.g. captured videos) with the social network group. System 102 also notifies users 504 and 506 that social network group has been created and they may then opt to join the group.

Figure 6:
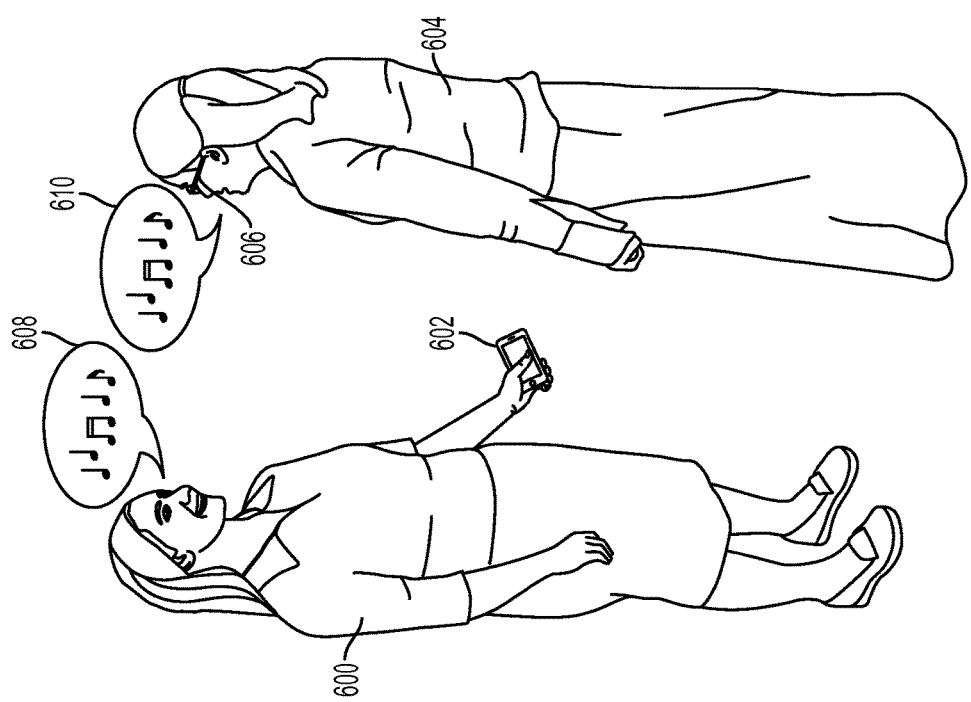
FIG. 6 illustrates an example scenario for recognizing users creating patterns, according to one implementation.

FIG. 6 illustrates an example scenario for recognizing users creating patterns, according to one implementation. In one scenario, target user 600 is using a given client device, for example a smartphone 602. In this example user 604 is proximate target user 600 and using a wearable computer 606. For example, target user 600 and user 604 may have met on the street. Target user 600 created or received an interesting post on a social network system and wishes to share this post with user 604.

In an example implementation, target user 600 indicates to user 604 that they wish to create a social network group and share information (e.g. "hey I'm going to sing this tune to create a group on the fly to share a post with you."). Target user 600 is depicted as generating a pattern that is an auditory pattern or tune 608. Non-limiting examples of auditory patterns could be a song, a hymn, a tune, a noise, a voice, a percussive sound, etc.

In various implementations, system 102 may use smart phone 602 to capture auditory information associated with target user's tune 608. For example, smart phone 602 may use any suitable electronic device such as a microphone to capture user's tune 608. System 102 may then generate a pattern map that corresponds to the distinct aspects of user's tune. For example the pattern map may map parameters such as amplitude, frequency, rhythm, etc.

User 604 may generate the same pattern as target user 600 by mimicking or humming the same tune 610. User 604's wearable computer 606 may include a microphone to capture user 604's tune 610. System 102 then generates a corresponding pattern map for user 604's tune 610.

System 102 may then apply a pattern recognition algorithm to recognize that user 604 is singing the same tune 610 as the tune 608 of user 600. In various implementations pattern recognition algorithm may use audio or acoustic fingerprinting to recognize and match sounds. System 102 then enables target user 600 to create a social network group, notify target user 600 that group has been created, enable target user 600 to invite user 604 to group, and enable target user to share assets (e.g. posts) with the group.

In various implementations, system 102 enables users to opt-in or opt-out of system 102 adding them to newly created groups generally and/or to groups associated with particular users of the social network system. In various implementations, system 102 enables users of the social network system to opt-in or opt-out of system 102 using their patterns or using their identity information in recognizing users generating patterns. Also, system 102 enables users of the social network to opt-in or opt-out of system 102 using their patterns for pattern recognition in general.

Implementations described herein provide various benefits and advantages. For example, implementations described herein also increase overall engagement among end-users in a social networking environment by facilitating the creation of groups among users of the social network system. An example advantage of the implementations described herein is that system 102 creates groups that naturally include people from specific events, meetings, trips, excursions, and other group activities, because the groups are based on people recognized as proximate the target user from such group activities. An advantage, is that target user may easily identify and opt to not invite other proximate users or lurkers that attempt to generate the same pattern as the target user and thereby try and join given groups. In some implementations, an advantage is that target user may quickly, efficiently, and seamlessly create social network groups with nearby users without having to pause and enter information into a mobile device, keyboard, mouse, terminal, etc. In various implementations, an advantage is that target user may visibly observe users that wish to join given groups.

While system 102 is described as performing the steps as described in the implementations herein, any suitable component or combination of components of system 102 or any suitable processor or processors associated with system 102 may perform the steps described.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time.

Figure 7:
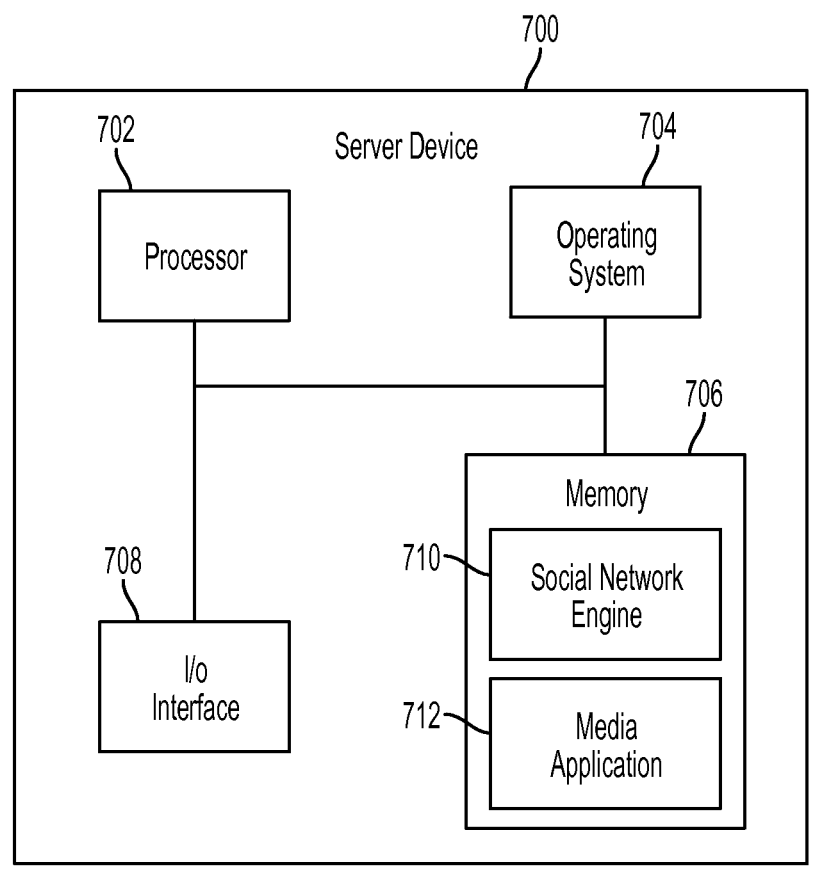
FIG. 7 illustrates a block diagram of an example server device, which may be used to implement the implementations described herein.

FIG. 7 illustrates a block diagram of an example server device 700, which may be used to implement the implementations described herein. For example, server device 700 may be used to implement server device 104 of FIG. 1, as well as to perform the method implementations described herein. In one implementation, server device 700 includes a processor 702, an operating system 704, a memory 706, and an input/output (I/O) interface 708. Server device 700 also includes a social network engine 710 and a media application 712, which may be stored in memory 706 or on any other suitable storage location or computer-readable medium. Media application 712 provides instructions that enable processor 702 to perform the functions described herein and other functions.

For ease of illustration, FIG. 7 shows one block for each of processor 702, operating system 704, memory 706, I/O interface 708, social network engine 710, and media application 712. These blocks 702, 704, 706, 708, 710, and 712 may represent multiple processors, operating systems, memories, I/O interfaces, social network engines, and media applications. In other implementations, server device 700 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

The server and/or server device may include, but is not limited to, a single processor system, a multi-processor system (co-located or distributed), a cloud computing system, or a combination of the above.

The client (or user, member or target user) device may include, but is not limited to, a desktop computer, a laptop computer, a portable computer, wearable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein may be used.

The user devices may be connected to a server via a network. The network connecting user devices to a server may be a wired or wireless network, and may include, but is not limited to, a Wi-Fi network, a local area network, a wide area network, the Internet, or a combination of the above.

The data storage, memory and/or nontransitory computer readable medium may be a magnetic storage device (hard disk drive or the like), optical storage device (CD, DVD or the like), electronic storage device (RAM, ROM, flash, or the like). The software instructions may also be contained in, and provided as, an electronic signal, for example in the form of software as a service (SaaS) delivered from a server (e.g., a distributed system and/or a cloud computing system).

Moreover, some implementations of the disclosed method, system, and computer readable media may be implemented in software (e.g., as a computer program product and/or computer readable media having stored instructions). The stored software instructions may be executed on a programmed general purpose computer, a special purpose computer, a microprocessor, or the like.

In various implementations, assistant services may be accessed on a device to assist the needs of a user. In some implementations, assistant services may be provided from one or more systems accessed remotely over one or more networks, such as the Internet or World Wide Web. For example, the services may be provided by one or more server systems connected to a network. Some implementations may implement assistant services locally to a device. Expert systems may be used in some implementations to provide desired information in specific subjects.

In some implementations, assistant services may include the use of intelligent assistants or "agents." These agents may be software that is accessible to a user using a device and that may access local functions and features of the device, as well as remote assistant services to gather information and/or perform actions to assist a user of the device. The agent may perform any of a variety of assistive functions.

Some implementations may provide an agent having a simple and natural interface to allow users to easily interact with the agent. In some examples, agents may perform user-friendly natural language processing of user input, for example user may use spoken input. For example, an agent may use voice recognition systems to interpret spoken input from user.

In situations where system 102 collects and/or uses personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from server that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location cannot be determined. Thus, the user may have control over how information is collected by system 102 and used by a content server.

What is claimed is:

1. A method comprising:
identifying at least one person that is proximate to a target user, wherein the at least one person and the target user are both members of a social network system;
determining that the target user's head is moving in a rhythmic pattern based on detection of head motion of the target user while the at least one person is proximate to the target user;
determining that the at least one person is generating the rhythmic pattern in time synchronization with the target user generating the rhythmic pattern based on a determination that the at least one person is performing physical movement while the at least one person is proximate to the target user;
applying a pattern recognition algorithm to the rhythmic pattern to generate a pattern map;
determining, based on the pattern map, that the rhythmic pattern corresponds to a known pattern;
recognizing an identity of the at least one person proximate to the target user in the social network system;
associating a first user profile of the at least one person and a second user profile of the target user with the known pattern based on the identity of the at least one person;
providing the target user with a profile photo of the at least one person via the social network system to verify that the at least one person recognized as generating the rhythmic pattern is correctly recognized;
creating a group in the social network system, wherein the group includes the at least one person generating the rhythmic pattern; and
associating the group with the target user.

2. The method of claim 1, wherein determining that the at least one person is generating the rhythmic pattern at a time when the target user is generating the rhythmic pattern comprises:
determining a pattern map score based on physical movement of the at least one person; and
comparing the pattern map score with the pattern map.

3. A method comprising:
identifying at least one person that is proximate to a target user, wherein the at least one person and the target user are both members of a social network system;
determining that the target user's head is generating a rhythmic pattern based on detection of head motion of the target user while the at least one person is proximate to the target user;
determining that the at least one person is generating the rhythmic pattern in time synchronization with the target user generating the rhythmic pattern;
identifying that the rhythmic pattern corresponds to a known pattern;
recognizing an identity of the at least one person proximate to the target user in the social network system;
associating a first user profile of the at least one person and a second user profile of the target user with the known pattern;
providing the target user with a profile photo of the at least one person via the social network system to verify that the at least one person recognized as generating the rhythmic pattern is correctly recognized; and
creating a group in the social network system, wherein the group includes the at least one person generating the rhythmic pattern and the target user.

4. The method of claim 3, wherein the profile photo is associated with the social network system.

5. The method of claim 3, wherein identifying that the rhythmic pattern corresponds to the known pattern is based on application of a pattern recognition algorithm to the rhythmic pattern.

6. The method of claim 3, wherein determining that the target user's head is moving in the rhythmic pattern is based on acceleration data from an accelerometer that is part of a wearable computing device associated with the target user.

7. The method of claim 3, wherein determining that the target user's head is moving in the rhythmic pattern is based on motion data associated with a motion device, wherein the motion data includes information about at least one of translation, rotation, pitch, yaw, roll, frequency, and entrainment.

8. The method of claim 3, wherein the rhythmic pattern is further based at least in part on a gesture.

9. The method of claim 3, wherein the rhythmic pattern is further based at least in part on a sound.

10. The method of claim 3, further comprising applying a frequency recognition algorithm to the rhythmic pattern.

11. The method of claim 3, further comprising notifying the target user that the group has been created.

12. The method of claim 3, further comprising notifying the at least one person recognized that the group has been created.

13. The method of claim 3, further comprising sending an invitation to join the group to the target user and to the at least one person recognized.

14. A system comprising:
one or more processors; and
logic encoded in one or more tangible media for execution by the one or more processors and when executed operable to perform operations comprising:
identifying at least one person that is proximate to a target user, wherein the at least one person and the target user are both members of a social network system;
determining that the target user is generating an auditory pattern based on detection of sounds while the at least one person is proximate to the target user;
determining that the at least one person is generating the auditory pattern in time synchronization with the target user generating the auditory pattern;
identifying that the auditory pattern corresponds to a known pattern;
recognizing an identity of the at least one person proximate to the target user in the social network system;
associating a first user profile of the at least one person and a second user profile of the target user with the known pattern; and
creating a group in the social network system, wherein the group includes the at least one person generating the auditory pattern and the target user; and
providing the target user with a profile photo of the at least one person in association with the group to verify that the at least one person recognized as generating the auditory pattern is correctly recognized.

15. The system of claim 14, wherein identifying that the auditory pattern corresponds to the known pattern is based on application of a pattern recognition algorithm to the auditory pattern.

16. The system of claim 14, wherein the logic when executed is further operable to perform operations comprising enabling the target user to remove the at least one person from the group.

17. The system of claim 16, wherein enabling the target user to verify that the at least one person recognized as generating the auditory pattern is correctly recognized includes prompting the target user to accept or deny that the at least one person recognized as generating the pattern is correctly recognized.

18. The system of claim 14, wherein determining that the target user is generating the auditory pattern further includes determining that the target user is generating one or more of: a rhythmic pattern, a repeated motion, and a gesture.

19. The system of claim 14, wherein the auditory pattern is at least one of a song, a hymn, a tune, a noise, and a percussive sound.

20. The system of claim 14, wherein the logic when executed is further operable to perform operations comprising applying a frequency recognition algorithm to the auditory pattern.

* * * * *